United States Patent [19]

Gunderson

[11] Patent Number: 4,725,293
[45] Date of Patent: Feb. 16, 1988

[54] AUTOMATIC CONTROL FOR PRESSURE SWING ADSORPTION SYSTEM

[75] Inventor: Jeff Gunderson, Tappan, N.Y.

[73] Assignee: The BOC Group, Inc., Montvale, N.J.

[21] Appl. No.: 926,280

[22] Filed: Nov. 3, 1986

[51] Int. Cl.$^4$ .............................................. B01D 53/04
[52] U.S. Cl. ...................................... 55/162; 55/163; 55/179; 55/387; 55/389
[58] Field of Search .................. 55/21, 25, 26, 62, 68, 55/74, 75, 160, 161, 163, 179, 387, 389

[56] References Cited

U.S. PATENT DOCUMENTS

| | | | |
|---|---|---|---|
| 3,230,688 | 1/1966 | Kitchen et al. | 55/21 X |
| 3,257,772 | 6/1966 | Maddox et al. | 55/21 X |
| 3,282,027 | 11/1966 | Johnson et al. | 55/21 |
| 3,703,068 | 11/1972 | Wagner | 55/62 X |
| 3,778,967 | 12/1973 | Kauer, Jr. et al. | 55/21 |
| 4,140,495 | 2/1979 | Pietruszewski | 55/21 |
| 4,197,095 | 4/1980 | White, Jr. et al. | 55/21 X |
| 4,299,595 | 11/1981 | Benkmann et al. | 55/21 |
| 4,323,370 | 4/1982 | Leitgeb | 55/18 |
| 4,349,357 | 9/1982 | Russell | 55/21 |
| 4,376,640 | 3/1983 | Vo | 55/26 |
| 4,404,005 | 9/1983 | Rowland | 55/163 |
| 4,472,177 | 9/1984 | Sircar | 55/21 |
| 4,494,966 | 1/1985 | Umeki | 55/26 |
| 4,504,286 | 3/1985 | Carlisle et al. | 55/21 X |
| 4,516,424 | 5/1985 | Rowland | 55/21 X |
| 4,539,019 | 9/1985 | Koch | 55/21 |
| 4,552,571 | 11/1985 | Dechene | 55/21 |
| 4,561,287 | 12/1985 | Rowland | 55/21 X |
| 4,561,865 | 12/1985 | McCombs et al. | 55/25 |
| 4,576,614 | 3/1986 | Armond et al. | 55/21 X |
| 4,643,743 | 2/1987 | Grader | 55/26 |

Primary Examiner—Robert Spitzer
Attorney, Agent, or Firm—R. Hain Swope; Chris P. Konkol; Larry R. Cassett

[57] ABSTRACT

A Pressure Swing Adsorption (PSA) system uses a constant cycle time and a control system to essentially automatically and continuously modify air input flow in order to insure that the produced nitrogen contains only a preselected range of an impurity which consists essentially of oxygen and to keep the output flow of nitrogen relatively high.

20 Claims, 6 Drawing Figures

10

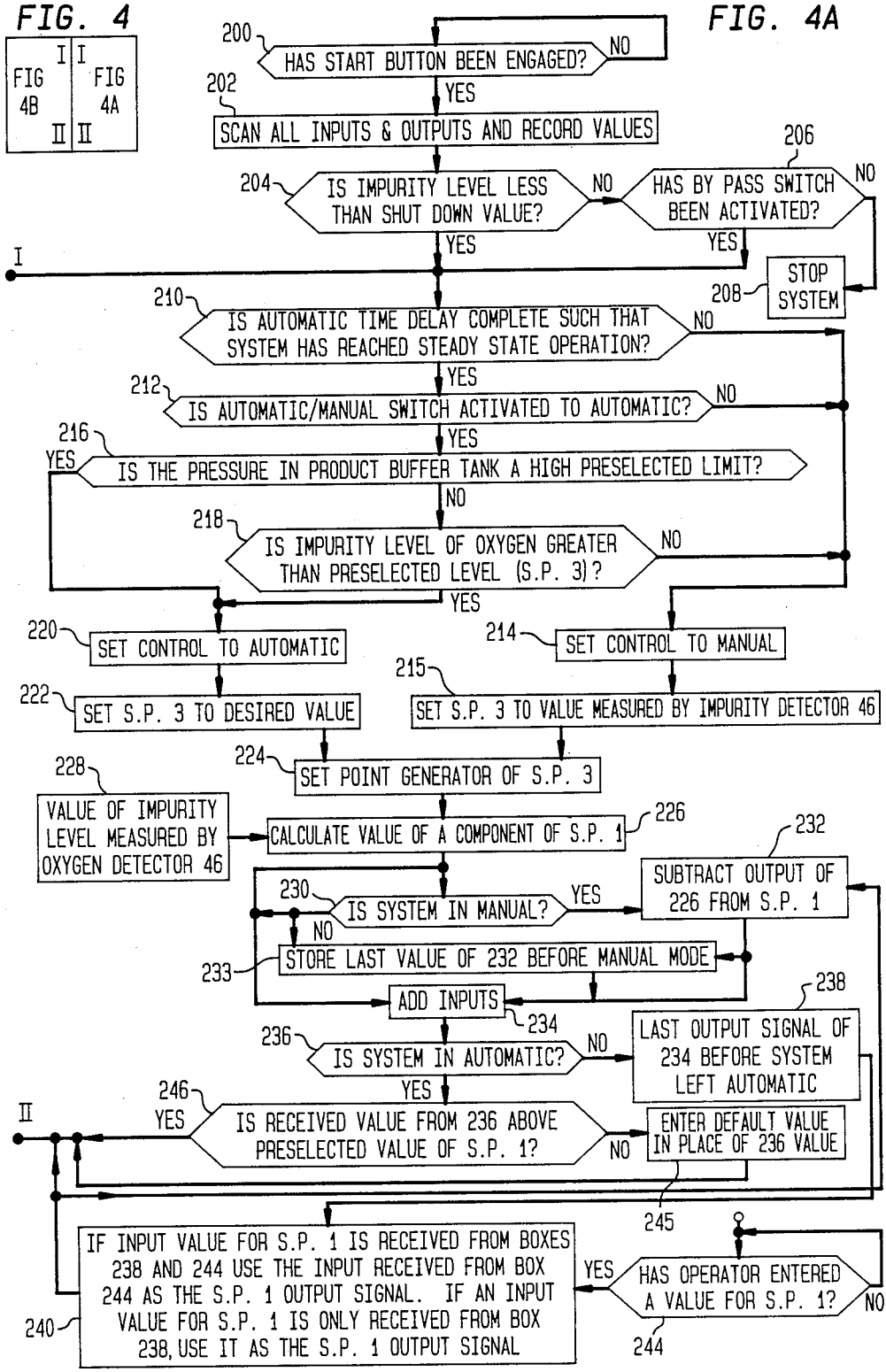

AUTOMATIC CONTROL FOR PRESSURE SWING ADSORPTION SYSTEM

FIELD OF THE INVENTION

This invention relates to fractionalization of air by selective adsorption and is particularly concerned with controlling a Pressure Swing Adsorption (PSA) system which fractionalizes air to recover a high purity component(s) thereof.

BACKGROUND OF THE INVENTION

A variety of control systems exist to control various parts of different processes for the separation of air by preferential adsorption. U.S. Pat. No. 4,472,177 is directed to a vacuum swing system for the recovery from air of a high purity nitrogen and an oxygen-enriched gas fraction. The system monitors the percentage of an impurity gas in the product gas as it comes out of an adsorption column and modifies the time duration of the steps of adsorption and regeneration (rinse) while keeping air input flow rate substantially constant. One problem with this type of control is that the equipment which senses the impurity gas in the product gas must have a relatively fast response time and is therefore relatively expensive. A buffer tank is usually coupled between the outputs of the chambers and a valve supplied by a customer to control the amounts of nitrogen received from the system. A second impurity measuring device is typically coupled to an inlet of a customer's valve to measure an impurity in the product gas. In addition, varying the time periods of the various steps of the process can cause disruptions in the steady state flow rate of the end gas product.

The present assignee and/or its subsidiaries market a Pressure Swing Adsorption (PSA) system which comprises two adsorption chambers. Each adsorption chamber contains a carbon structure which preferentially adsorbs oxygen from incoming air. First and second pressure regulators (mechanically adjustable pressure control valves) are in series with an inlet line to the chambers and an outlet line from the chambers, respectively. A holding tank coupled to the outlet line of the adsorption chambers collects nitrogen gas which contains oxygen as an impurity. An oxygen detector is coupled to an outlet line of the holding tank. The system is designed to automatically shut down if the oxygen content of the outlet gas exceeds a preselected limit. The amount of oxygen is manually read from the analyzer and the pressure set point of the first regulator is mechanically adjusted to control the pressure and therefore flow rate of air into the system to control the percentage of oxygen in the recovered nitrogen. After this mechanical adjustment the system is allowed to run for an hour to an hour and a half to allow it to come to a new steady state operating point. If the percentage of oxygen impurity is determined to be within preselected limits then no further adjustments are needed. If not then another adjustment of the set pressure of the first regulator is made and the system is again run until it comes to a new steady state point. This process is repeated until the oxygen impurity level is within a preselected range. If the input flow rate of air is decreased too much then the concentration of oxygen will decrease to a value below the preselected limit with output flow rate of the desired nitrogen also decreasing. The first regulator must then be readjusted to increase the input flow of air so as to increase the output flow of nitrogen while keeping the oxygen impurity percentage at a preselected level. These manual adjustments can be very time consuming and are typically required on a regular basis.

The extent of adsorbtion of oxygen by the carbon structures is a function of the ambient temperature of the incoming air and adsorption chambers. Thus the oxygen impurity level generated in the above described system is a function of the ambient temperature of the incoming air and the adsorption chambers. For example, a system can be designed to produce 4000 standard cubic feet per hour (SCFH) with 1% impurity at an ambient temperature of 70° C. This system may produce an output with 1.3% impurity at 4000 SCFH at an ambient temperature of 90° C. The system must therefore be designed to provide the required impurity level under worst case conditions which means at normal ambient conditions the system is over designed in terms of capacity. The need for repeated time consuming adjustments by maintenance personnel, coupled with the requirement of an over designed system results in a product in which the economies of production and operation can clearly use improvement.

It is desirable to have a PSA system in which the inlet air flow rate is automatically and continuously adjusted so as to maintain the oxygen impurity level at a preselected value while permitting the nitrogen flow rate to be as high as possible at existing temperature conditions while essentially eliminating the need for manual readjustment of the system.

SUMMARY OF THE INVENTION

The present invention is directed to a control system for use with a gas fractionalization system. A first portion of the control system continually monitors the level of an impurity component in a recovered gas ("the product gas") being produced and automatically and continually adjusts gas flow through the system so as to keep the impurity component in the product gas within preselected levels while maintaining the product gas flow rate as high as reasonably possible.

The fractionalization system has a valve having an actuator which controls the size of an opening therein which is in communication with a chamber which contains material which is adapted to preferentially adsorb one or more components of gas entering therein. The control system comprises a convertor means, a flow detecting means, an impurity detector, and first and second comparator means.

The convertor means has an input and an output with the output being coupled to the actuator of the valve. It effectively controls the size of the opening in the valve and thus controls the rate of flow of gas through the chamber. The flow detecting means is coupled to the chamber and generates at an output thereof a signal which is proportional to the rate of gas flowing through the chamber. The impurity detector is coupled to an outlet of the chamber and is adapted to generate at an output thereof a signal that is proportional to an amount of an impurity in the product gas exiting the chamber. The first comparator means has a first input which is adapted to be coupled to a first reference signal and has a second input coupled to the output of the impurity detector. A level of the first reference signal is selected to be proportional to the amount of impurity gas to be allowed (tolerated) in the product gas. The first comparator means generates at an output thereof a signal which is proportional to the difference between the reference signal and the signal received from the impurity detector. The second comparator means has first and second inputs and an output coupled to the output of the flow detector means, to the output of the first comparator means, and to an input of the convertor means, respectively. The second comparator means compares signals received from the first comparator means and the flow detector means and generates at an output thereof a signal which causes the convertor means to adjust the size of the opening in the valve so as to maintain the impurity in the product gas at a preselected level.

In a preferred embodiment the fractionalization system is a Pressure Swing Adsorption (PSA) system with the input gas being air, the product gas being nitrogen, and the impurity gas being oxygen. The flow detecting means is a pressure monitor which generates an electrical current as an output signal. The convertor means responds to an electrical current signal at the input thereof and generates a force proportion thereto at the output thereof. This force causes the valve to open or close by an amount which is proportional to the force and the direction of same. The first and second comparators can be implemented in discrete electronic or pneumatic components. In a preferred embodiment they are implemented as software routines which are executed by a microprocessor.

The control system of the present invention is adapted to automatically and continuously adjust the input flow rate of air in the PSA system to an extent such that the nitrogen produced is typically 97 or more percent pure. The control circuitry automatically increases the input air flow rate so as to increase the output nitrogen flow rate while still keeping the impurity oxygen level thereof at no more than a preselected level if the percentage of an impurity becomes lower than is required. Conversely, if the percentage of input becomes higher than a preselected level, the control circuitry automatically decreases the input air flow rate so as to decrease the output nitrogen flow rate and maintain the percentage of impurity at a preselected level.

In the preferred embodiment a Pressure Swing Adsorption (PSA) system separates air into nitrogen and oxygen. The nitrogen is the product gas and oxygen which is mixed with the nitrogen is considered an impurity. The PSA system uses two chambers and a cycle of operation which includes: A. a pressurizing portion in which one of the chambers fills with air which remains in the chamber for a long enough time for a carbon structure in the chamber to adsorb a significant amount of the oxygen from the air and until a preselected pressure is built up in the chamber, B. a production portion in which nitrogen with some oxygen exits the chamber and is collected in a buffer tank, and C. an equalization portion in which the two chambers are coupled together and the pressure in both equalizes. During the time one chamber is pressurized and subsequently produces nitrogen, the other chamber is allowed to vent out oxygen rich waste gas through an exhaust vent so as to regenerate and be ready to again adsorb more oxygen when it is pressurized. The oxygen rich waste gas typically includes oxygen, nitrogen, water vapor, carbon dioxide and other trace elements. After the equalization portion of the cycle the second chamber is pressurized and the first chamber is allowed to vent out the oxygen rich waste gas.

During the production portion of the cycle a first portion of the control system automatically and continually adjusts the position of the first valve. This adjusts the rate of air flow into the chambers so as to keep the level of oxygen in the produced nitrogen at a preselected level. During the pressurization portion of the cycle of operation the control system has a second portion thereof which senses pressure in the chamber being pressurized and automatically adjusts the opening of the valve at the beginning of the next pressurization portion of the cycle so as to control the flow of air into the chamber to facilitate pressurization occurring within a preselected time period providing adequate residence time in the chamber which allows for sufficient oxygen adsorption before product gas is released.

The second portion of the control system comprises pressure sensing means for measuring pressure within the chambers, a pressurization time measuring means for measuring the time it takes to pressurize one of the chambers from an equalization pressure to a preselected level and a third comparator means. The pressure sensing means is coupled to a first input of the pressurization time measuring means. A second input of the pressurization time measuring means is adapted to be coupled to a reference level which is proportional to a desired final pressure to be achieved during pressurization of a chamber. The third comparator means has a first input thereof coupled to an output of the pressurization time measuring means and is adapted to be coupled by a second input to a time reference signal whose level is proportional to a preselected time in which it is desired that a chamber being pressurized reaches a preselected pressure. An output of the third comparator means is coupled to the input of the convertor means. An output signal of the third comparator means is proportional to the difference between the input reference signal applied thereto and the signal received from the pressurization time measuring means. This output signal controls the convertor means such that the size of the opening in the valve is adjusted and fixed at the beginning of the pressurization portion of the cycle of operation to adjust air flow into a chamber so as to facilitate pressurization within the preselected time.

The present invention will be better understood from the subsequent more detailed description of an illustrative embodiment taken in conjunction with the accompanying drawings.

BRIEF DESCRIPTION OF THE DRAWINGS

FIG. 4 is a diagram showing the proper alignment of the drawing sheets of FIGS. 4A and 4B. FIGS. 4A and 4B collectively show a flow chart illustrating the function of part of the embodiment of FIG. 3 in accordance with the present invention.

DETAILED DESCRIPTION

Figure 1:
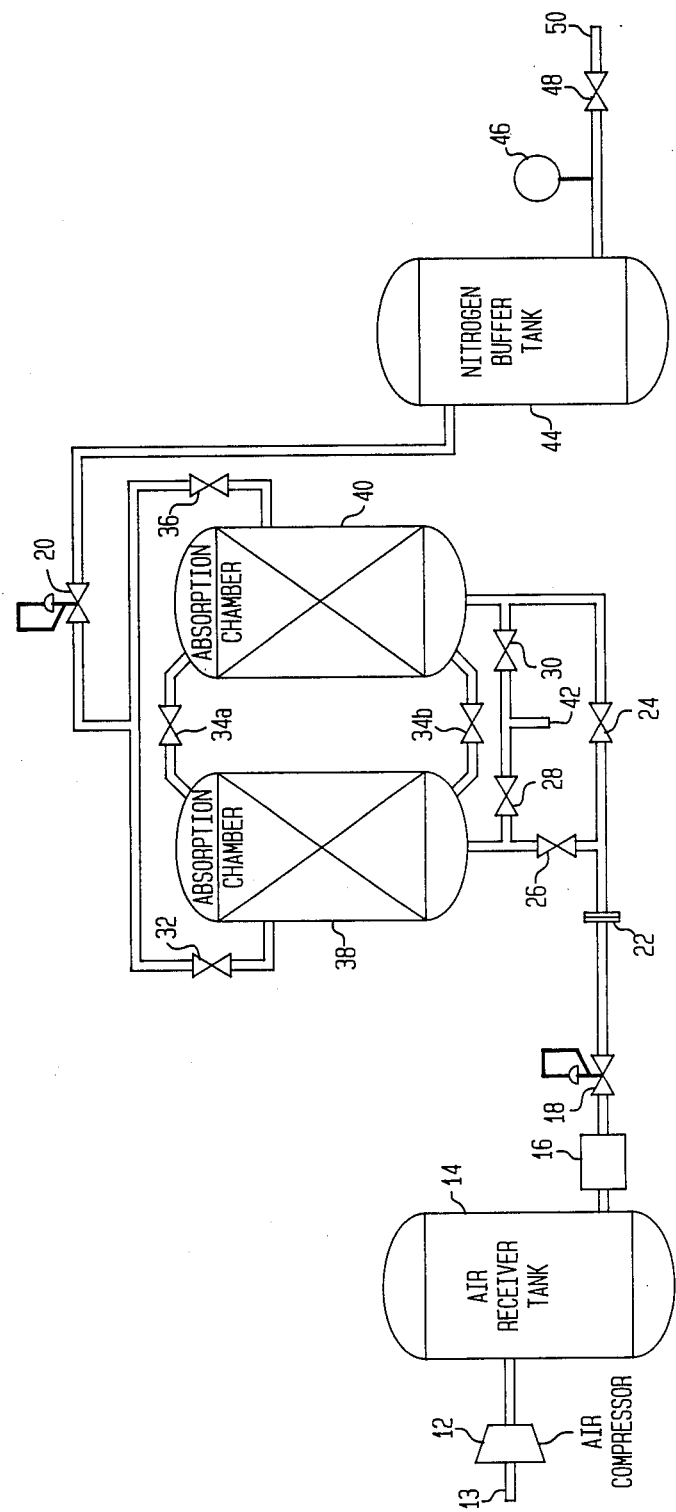
FIG. 1 shows one illustrative embodiment of a commercially available system.

Referring now to FIG. 1, there is shown the essential components of a Pressure Swing Adsorption (PSA) system 10 which is briefly described in the background of the invention as a commercially available system. System 10 comprises an air compressor 12 having an inlet 13, an air receiver tank 14, a water and oil filter 16, pressure regulators 18 and 20, an orifice plate 22, valves 24, 26, 28, 30, 32, 34a, 34b and 36, first 38 and second 40 adsorption chambers each containing carbon structures (not shown) adapted to preferentially adsorb oxygen from air in the chambers, an exhaust vent 42, nitrogen buffer tank 44, and an impurity (oxygen) detector (oxygen sensor and transmitter) 46. Typically, an end user of system 10 couples a valve 48 to an outlet of tank 44 to be able to control the amount of nitrogen gas received from system 10 at an outlet 50 of valve 48. Air is pulled in through inlet 13 of air compressor 12 and nitrogen exits system 10 through outlet 50.

Air pulled into inlet 13 of air compressor 12 is fed into tank 14. Compressor 12 is typically an oil flooded screw type compressor. Air from tank 14 passes through filter 16 where any oil and water droplets are removed. The air then passes through regulator 18. Regulator 18 is a valve with a mechanical pressure regulator which senses the pressure at an outlet thereof and keeps the valve open when the outlet (down stream) pressure is at or below that which the valve is mechanically set to control. The pressure at which regulator 18 controls (known as the set pressure) can be adjusted mechanically by turning a portion thereof to adjust compression on an internal spring (not shown) thereof. The air now passes through an opening (not shown) in orifice plate 22 which limits the maximum flow rate of air which enters chamber 38 or 40 so as to prevent damage to the carbon structures. Valves 24 and 26 are on-off type valves with same being operated with one being open and the other being closed. Valves 32 and 36 are unidirectional type on-off valves (check valves) which allow a flow of gas from chambers 38 and 40, respectively, and through regulator 20, but prevent the flow of gas in the reverse direction. Typically product gas (nitrogen) flows from chamber 38 or 40 and therefore valve 32 or valve 36 is open and the other is closed. Air can flow into chamber 38 but cannot flow into chamber 40 with valves 26 and 32 open and valves 24 and 36 closed. Air can flow into chamber 40 but can not flow into chamber 38 with valve 26 closed and valve 24 open. Automated controls (not illustrated) are typically used to open and close all the valves except for regulators 18 and 20 and valves 32, 36 and 48.

System 10 operates on a cycle which includes a pressurization portion, a production portion, and an equalization portion. Only one of chambers 38 and 40 receives air at a time. Assume that valves 26, 30 and 32 are open and that valves 24, 28, 34a, 34b and 36 are closed. Air from compressor 12 fills chamber 38 and causes the pressure of chamber 38 to rise until the pressure in chamber 38 is at the level at which regulator 20 opens. This is known as the pressurization portion of the cycle. When the pressure in chamber 38 reaches the set pressure of regulator 20, regulator 20 opens and releases product nitrogen. This begins the production portion of the cycle. Air continues to enter chamber 38 during the production portion of the cycle with continued adsorption of oxygen. Product nitrogen exits chamber 38 and passes through regulator 20 and collects in tank 44. During the pressurization and production portions of the cycle for chamber 38, chamber 40 is allowed to regenerate by releasing oxygen rich waste gas through valve 30 and out through exhaust vent 42 into the atmosphere. The oxygen rich waste gas typically includes oxygen, nitrogen, water vapor, carbon dioxide and other trace elements. At this time valve 28 is closed and therefore no air or component thereof can exit chamber 38 via valve 26 and exhaust vent 42.

At the end of the production portion of the cycle for chamber 38, valves 24, 26, 28, 30, 32 and 36 are closed and valves 34a and 34b are opened. This allows pressure in chambers 38 and 40 to equalize. Typically valve 34a is located near the top of the chambers and valve 34b is located near the bottom of the chambers. This portion of the cycle of operation is denoted as the equalization portion. Now valves 26, 30, 32 and 34 are closed and valves 24, 28, and 36 are opened. This allows air to flow into chamber 40 and causes the pressure of chamber 40 to rise until the pressure in chamber 40 is at the level at which regulator 20 opens. This is the pressurization portion of the cycle for chamber 40. Nitrogen within chamber 40 then passes through regulator 20 and is collected in tank 44. This is the production portion of the cycle for chamber 40. During the pressurization and production portion of the cycle of operation of chamber 40, oxygen enriched waste gas exits chamber 38 through valve 28 and vents out through exhaust vent 42 into the atmosphere. This regenerates the carbon structure of chamber 38. Valves 24, 26, 28, 30, 32 and 36 are then closed and valves 34a and 34b are opened. This equalizes the pressures in chambers 38 and 40. A new cycle now begins with chamber 38 being again pressurized with air.

In one application, system 10 is typically operated on a two minute cycle. During the first approximate 25 seconds air is fed into chamber 38 through open valve 26 and oxygen is adsorbed in the carbon structure of chamber 38 as the pressure therein rises until it reaches the set point pressure of regulator 20. When this occurs regulator 20 opens and nitrogen flows out of chamber 38, through valve 32, regulator 20 and into tank 44 for the next 31 seconds. Valves 34a and 34b are then opened up for 4 seconds to equalize the pressure in chambers 38 and 40 while all other valves are closed. Valves 26, 30, 32, 34a and 34b are closed and valves 24, 28 and 36 are opened for the next 56 seconds. Oxygen in the carbon structure of chamber 38 vents out through vent pipe 42 into the atmosphere and air flows into chamber 40 for the next 56 seconds. Oxygen is now adsorbed in chamber 40 and nitrogen flows out of chamber 40 through open valve 36 and regulator 20 and then into tank 44. Valve 34 is then again opened for 4 seconds to equalize pressure between chambers 38 and 40 while valves 24, 26, 28, 30, 32, and 36 are closed. The cycle then starts again with valves 26, 30 and 32 opening and valves 24, 28, 34 and 36 closing.

In the commercially available PSA system, regulator 20 is typically set to maintain an essentially constant pressure in chambers 38 and 40 during the production part of the cycle when nitrogen is being produced. The set pressure of regulator 18 is manually adjusted by turning a portion thereof to create a differential pressure between an outlet of 18 and an inlet of 20 so as to establish and control the flow rate through the system. The set pressure of 18 is adjusted so as to cause 18 to further restrict the flow of air into chamber 38 or 40 if it is determined by reading a gauge (not shown) of oxygen detector 46 that the percentage of oxygen in tank 44 is greater than a preselected limit. This allows chambers 38 and 40 to adsorb a higher percentage of oxygen from the incoming air which lowers the amount of oxygen which reaches tank 44. Conversely, the set pressure of 18 is adjusted so as to increase the flow of air into chamber 38 or 40 if it is determined that the percentage of oxygen in tank 44 is below a preselected limit. This results in the chambers adsorbing a lower percentage of oxygen from the incoming air, which increases the amount of oxygen reaching tank 44. It typically takes from one to one and a half hours after the set pressure of 18 is adjusted for the effect thereof to be fully felt. Further time consuming adjustments are necessary if the first adjustment does not bring about the desired result.

The temperature of the incoming air and the temperature of the chambers affects the amount of oxygen adsorbed in the carbon structures of chambers 38 and 40. Thus, the percent of oxygen which is contained in the nitrogen product also varies with these parameters. It has been found that the commercially available system 10 requires frequent field adjustments, to compensate for temperature variations, which are undesirable.

Figure 2:
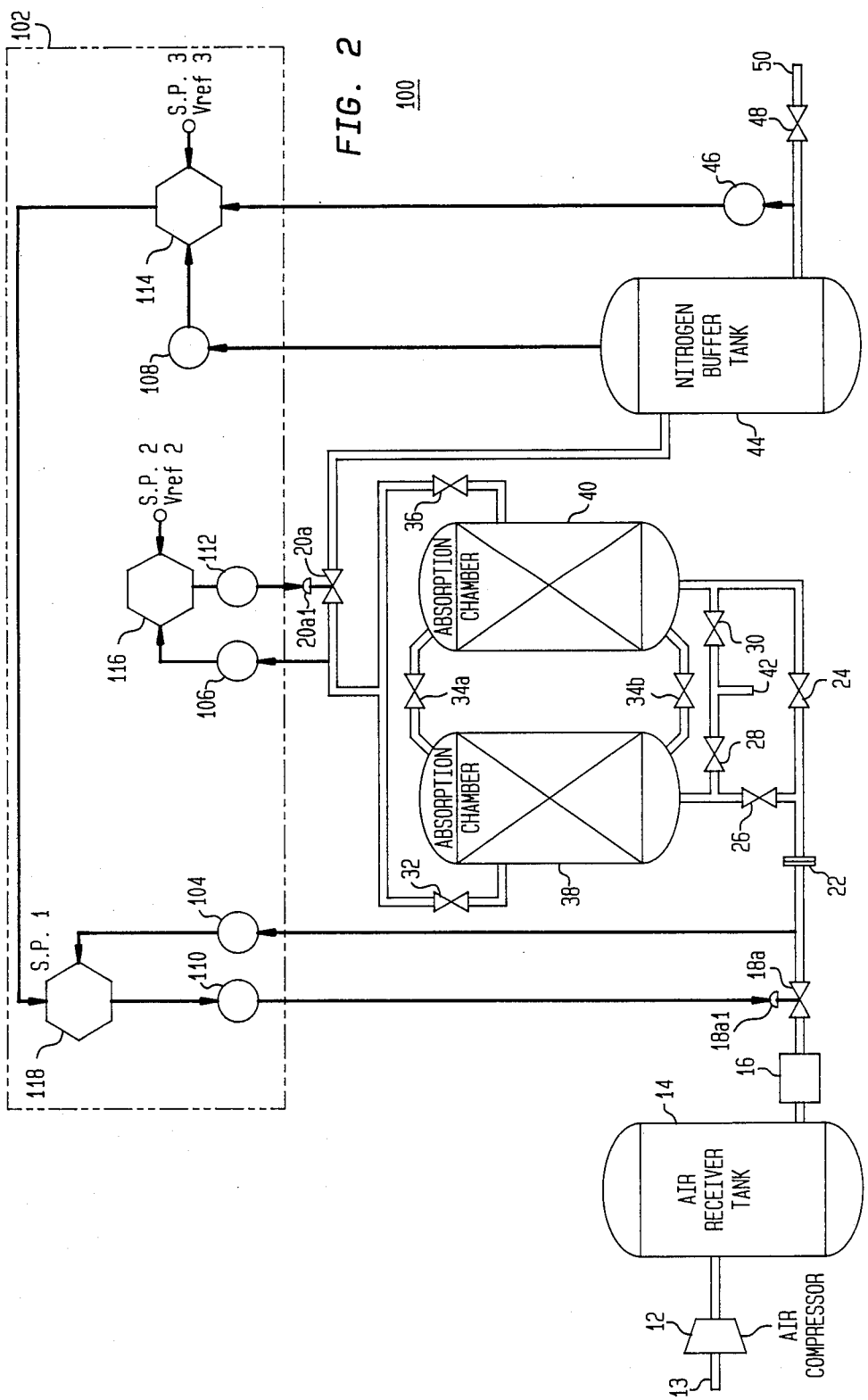
FIG. 2 shows an illustrative embodiment in accordance with the present invention.

Referring now to FIG. 2, there is shown a Pressure Swing Adsorption (PSA) system 100 which comprises an automatic control system shown within the dashed line rectangular figure 102 (denoted as control system 102) which is coupled to a system which is essentially identical to system 10 of FIG. 1 except that regulators 18 and 20 have been replaced with valves 18a and 20a. Valves 18a and 20a have actuators 18a1 and 20a1, respectively, which control the size of openings (not shown) in valves 18a and 20a, respectively. Control system 102 comprises a first, second, and third pressure sensor and transmitters 104, 106, and 108 (also denoted as detecting means), first and second convertors (also denoted as convertor means) 110 and 112, and first, second, and third comparator-controllers (also denoted as comparator means) 114, 116, and 118. Pressure sensor and transmitter 104 may be denoted as flow detecting means or as pressure detector means.

An inlet of pressure sensor and transmitter 104 is coupled to a conduit which couples an outlet of valve 18a to an inlet of orifice plate 22. Pressure sensor and transmitter 104 senses (measures) the pressure in the conduit between valve 18a and orifice 22 (denoted as inlet air pressure). At an output thereof it generates a current signal which is proportional to the measured pressure. The output of 104 is coupled to an input of comparator-controller means 118. An output of comparator-controller means 118 is coupled to an input of convertor 110. An output of convertor 110 is coupled to an actuator of valve 18a. Convertor 110 is typically a current to pressure convertor which in response to a current signal received on the input thereof generates a force at the output thereof. A force applied to actuator 18a1 of valve 18a causes an opening (not shown) in valve 18a to enlarge or contract proportionally to the magnitude and direction of the force exerted thereon.

Comparator 118 has a set point input s.p.1 which is coupled to an output of comparator-controller 114. As will become clear later herein, a single received from comparator-controller 114 at input s.p.1 of 118 effectively adjusts the flow rate of air into chamber 38 or 40 by adjusting the size of the opening of valve 18a. The signal level at s.p.1 is the same as is generated at the output of comparator 114 and is representative of the required inlet air pressure. Comparator 118 compares this signal and the signal generated by 104 (the measured pressure) and generates a signal at the output thereof which is proportional to the difference between the two input signals. Converter means 110 causes valve 18a to contract the size of the opening there in so as to cause the pressure at the output thereof to drop to the s.p.1 pressure level if the measured pressure is greater than the s.p.1 pressure. This causes the air flow through valve 18a and into chamber 38 or 40 to decrease. The size of the opening in valve 18a enlarges so as to allow the pressure at the output of valve 18a to increase up to the s.p.1 level if the measured pressure is less than the s.p.1 pressure. This causes the air flow through valve 18a and into chamber 38 or 40 to increase. When the measured pressure is at the s.p.1 level the size of the opening through valve 18a is maintained. The pressure at the outlet of valve 18a is known to be proportional to the air flow into chamber 38 or 40. Accordingly, the adjusting of the pressure also adjusts the flow rate of air into one or the other of chambers 38 and 40.

Over a useful range the flow rate of air into chambers 38 and 40 is proportional to the amount of impurity in the nitrogen product collected in tank 44. As will become clear later herein, if the amount of oxygen in the produced nitrogen is above a preselected level then comparator-controller 114 generates an output signal thereof which causes the size of the opening in valve 18a to decrease so as to reduce the air flow rate into chambers 38 and 40. This in turn allows for greater adsorption of oxygen from the air that enters chambers 38 or 40. Accordingly, the nitrogen product which reaches tank 44 has a smaller amount of oxygen contained therein. Conversely, if the amount of oxygen in the product nitrogen is below the preselected level then comparator-controller 114 generates an output signal which causes the size of the opening in valve 18a to increase so as to increase the air flow into chambers 38 and 40.

The mathematical function performed by comparator-controller 118 is of the following form:

$$M = G(r-c) + K, \qquad \text{(Eq. 1)}$$

where M is the output, G=the proportional gain, r=the second input signal to input port s.p.1 of 118 (the set pressure), c=the first input signal to 118 (the process variable being pressure), and K is the output level of 118 when r−c=0 (i.e., there is no difference (error) between r and c).

In a preferred embodiment comparator-controllers 114, 116, and 118 are all implemented by an Eagle Signal Model No. EPTAK 240 microprocessor based programmable controller using software provided therewith which includes Proportional-Integral and Derivative (P-I-D) control algorithms.

An inlet of pressure sensor and transmitter 106 is coupled to a conduit which couples chambers 38 and 40 to an inlet of valve 20a. Pressure sensor and transmitter 106 senses (measures) the pressure in the conduit between chamber 38 or 40 and an inlet of valve 20a and generates at an output thereof a current signal which is proportional to the measured pressure. The output of 106 is coupled to a first input of comparator-controller means 116. An output of 116 is coupled to an input of converter 112. An output of converter 112 is coupled to actuator 20a1 of valve 20a. Converter 112 is essentially identical to converter 110 and causes an opening (not shown) in valve 20a to enlarge or contract proportionally to the magnitude and direction of the force exerted on actuator 20a1. A second input s.p.2 of 116 is coupled to a fixed reference signal Vref2. Vref2 corresponds to a preselected pressure at which it is desired to operate chambers 38 and 40 during the production portion of the cycle of operation thereof.

Comparator 116 compares the signal levels at the two inputs thereof and generates an output signal having a level proportional to the differences between the pressure measured at the input of valve 20a and the applied Vref2 at input s.p.2. Converter means 112 causes the opening in valve 20a to enlarge so as to decrease the pressure if the measured pressure is greater than Vref2. Valve 20a contracts the opening therein so as to allow the pressure to increase if the measured pressure is less than Vref2. The combination of 106, 110, and 112 act to control the size of the opening through valve 20a so as to keep pressure at an essentially constant preselected level in chambers 38 and 40 during the production portion of the cycle of operation. The changes in pressure at the output of valve 18a caused by adjustments to the size of the opening therein are essentially dropped across orifice plate 22 such that the pressure in chamber 38 or 40 during the production portion of the cycle of operation is essentially constant and determined by Vref2 applied to 116. System 100 is designed such that there is a positive pressure drop across chambers 38 and 40 during the pressurization and production portions of the cycle of operation so as to establish continuous flow through the chambers.

The mathematical function performed by comparator-controller 116 is in the following form:

$$M = G(c-r) + K, \quad \text{(Eq. 2)}$$

Where M, G, c, r and k are as defined in the equation previously given for the operation of 118.

An output of oxygen detection 46 is coupled to a first input of 114. A second input s.p.3 of 114 is coupled to a reference signal Vref3 which is representative of the maximum level of oxygen to be allowed in the product. An output of 114 is coupled to input s.p.1 of 118.

Oxygen detector 46 provides an output current signal whose level is proportional to the percentage of oxygen in the nitrogen received from tank 44. Vref3 is a signal which has a level proportional to the maximum desired level of oxygen which is to be tolerated in tank 44. Comparator-controller 114, compares the percentage of oxygen measured (the output signal of 46) to Vref3, the maximum desired, and generates an output signal at the output thereof which is inversely proportion to the difference between the two. If the level of oxygen in tank 44 is above the Vref3 the output signal of 114 is lower than if the oxygen level is at or below that desired. This output signal becomes the input signal at input s.p.1 of 118. This causes 118 to reduce the output signal thereof which causes converter 110 to adjust the force applied to actuator 18a1 of valve 18a to cause the opening in valve 18a to contract. This causes a reduction in the flow rate of air into chambers 38 and 40 during the production portion of the cycle of operation which effectively reduces the amount of oxygen which reaches tank 44. This keeps the nitrogen in tank 44 at the desired purity.

Comparator-controller 114 causes the input signal to s.p.1 to increase so as to increase the flow rate of incoming air if the level of oxygen in tank 44 is significantly below the maximum desired level (Vref3). This also increases the flow rate of produced nitrogen while maintaining the oxygen content at a preselected level.

The mathematical function performed by comparator-controller 114 is of the following form:

$$M = G[(r-c) + 1/I(r-c)dt + Dd(r-c)/dt] + K, \quad \text{(Eq. 3)}$$

where M=the output of 114, G=the proportional gain, c=the second input signal to 114 (the process variable—the impurity percentage of oxygen), r=the third input signal to input s.p.3 of 114 (Vref3), I=an integration constant, D=the derivative or rate constant, and K is a constant which is the output if r−c=0 (there is no difference (error) between r and c).

A user of system 100 may have a decreased need for nitrogen and therefore may significantly close valve 48. This significantly reduces the output flow of nitrogen and also significantly limits the flow of air into chambers 38 and 40. Chambers 38 and 40 are therefore able to adsorb a higher percentage of the oxygen from the incoming air which reduces the content of oxygen in the product nitrogen. Oxygen sensor transmitter 46 therefore provides a decreased current signal to 114 which generates an increased output signal to 118 which in turn generates an increased output signal to 110 that causes an increase in the opening of valve 18a. This would provide a means for allowing a greater flow of air into chambers 38 and 40 in an attempt to increase the oxygen content to the value of s.p.3. The air flow into chambers 38 and 40, however, is limited by the opening in valve 48 which is set in accordance with the user's nitrogen requirement. Comparator-controller 114 will continue to act to increase the size of the opening in 18a until it is fully open. If the user then requires more nitrogen and opens up valve 48, the chambers would become flooded with air and the percentage of impurity of oxygen would rise rapidly. Comparator-controller 114 could not respond rapidly enough and the system would automatically shut down.

To prevent this from occurring, tank 44 is monitored for a build up in pressure which would occur if valve 48 was significantly closed. This pressure build up is transmitted via 108 to 114 which is adapted upon receiving such a signal to cause the s.p.3 input signal level to assume the level existing at the output of 46 such that a zero error is generated within 114. This freezes the output signal level of 114 in accordance with the mathematical control algorithm of Eq. 3. This effectively maintains s.p.1 of 118 at the value it was at prior to valve 48 being significantly closed. When valve 48 is subsequently significantly reopened the inlet air flow resumes at the rate that existed prior to valve 48 being closed. Thus the purity of the nitrogen flowing into tank 44 returns to the previous level.

There may be situations in which the user has only a minimal reduction in the need for nitrogen and only slightly closes valve 48. The oxygen content in the product will decrease slightly while the pressure in tank 44 increases causing 108 to deactivate 114. During this reduced requirement period, ambient temperature changes may cause the impurity content of the nitrogen to increase to a level greater than the set point Vref3. In such a case 114 is adapted to ignore the deactivation signal from 108 and to continue responding to the signal from 46 to bring the oxygen content to the preselected level.

Comparator-controller 114 is designed to allow operation of system 100 in a manual or in an automatic mode of operation via a selector switch. 114 is deactivated in a manner similar to that when nitrogen demand is reduced. In the manual mode of operation an operator selects and applies a signal level to the s.p.1 input of 118. 114 is designed to allow the applied level to input s.p.1 of 118 to remain and thus to control 118. Manual operation is useful during start up of system 100 or during testing of system 100. During normal operation system 100 is operated in the automatic mode.

Comparator-controller 114 is also designed to provide a bumpless transfer when system 100 is switched from an automatic mode to a manual mode. When system 100 is in an automatic mode of operation the signal level into input s.p.1 of 118 is controlled by 114. When system 100 is in the manual mode of operation the signal level into input port s.p.1 of 118 is set manually and 114 is adapted so as to not over ride this manual setting. When system 100 is switched from manual to automatic, 114 causes the previously manually applied value to input port s.p.1 of 118 to be maintained for a short period of time so as to insure a bumpless transfer from one mode of operation to another.

Figure 3:
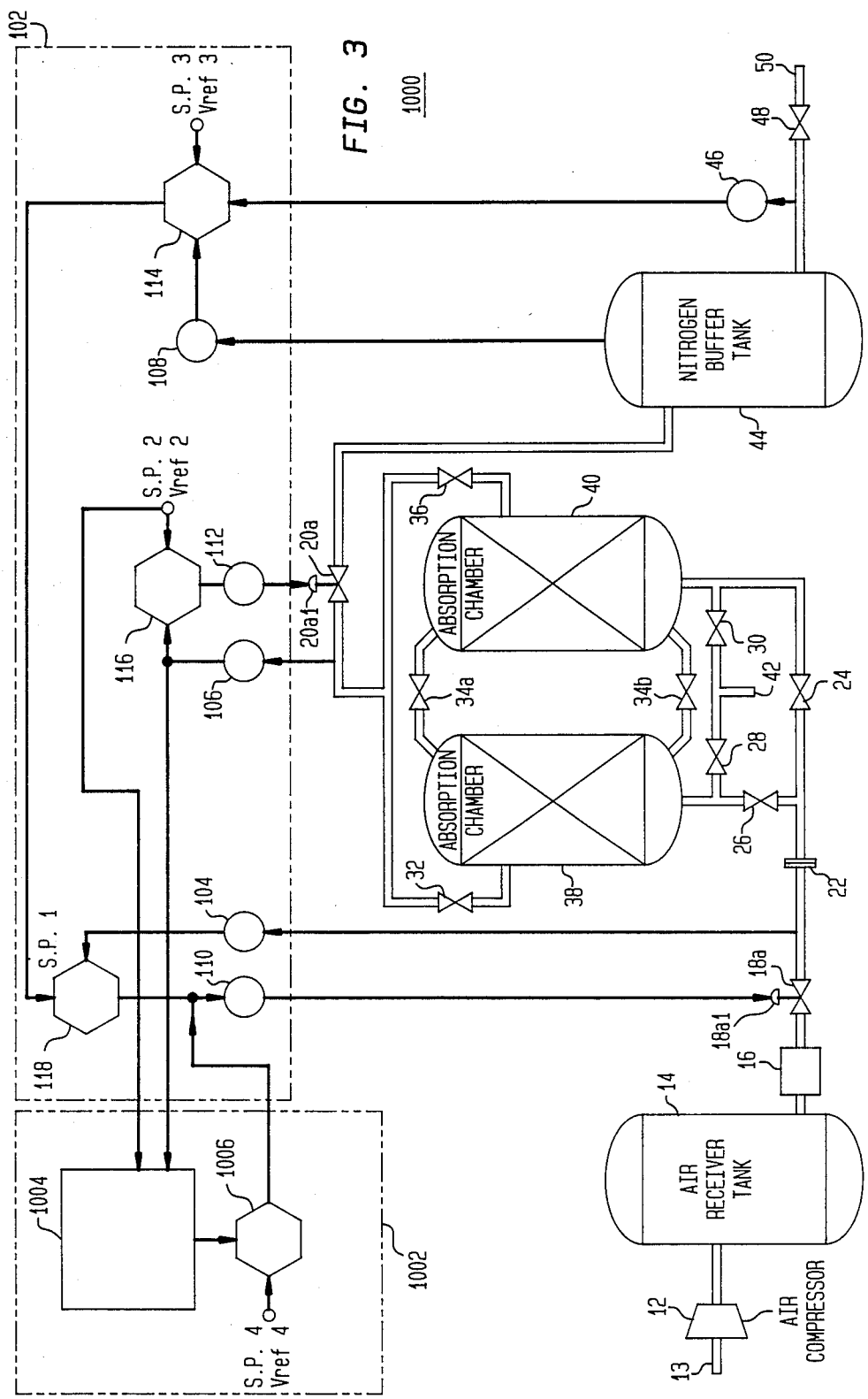
FIG. 3 shows another illustrative embodiment in accordance with the present invention.

Referring now to FIG. 3, there is shown a Pressure Swing Adsorption (PSA) system 1000 which includes essentially all of the components of system 100 of FIG. 2 and in addition comprises within dashed line rectangle 1002 (denotes as control system 1002) a pressurization time measuring device (means) 1004, and a comparator-controller 1006. Components 1004 and 1006 permit system 1000 to control the air flow into chamber 38 or 40 during the pressurization portion of the cycle of operation so as to control the time needed to cause either of chambers 38 or 40 to reach a pressure of Vref2. It has been found that it is desirable to control the time in which chamber 38 or 40 is pressurized to a preselected pressure to insure that there is sufficient residence time in the chamber to allow adequate oxygen adsorption before product gas is released.

Pressurization time measuring device 1004 is coupled by a first input thereof to an output of pressure sensor-transmitter 106, is coupled by a second input to Vref2 and is coupled by an output thereof to a first input of comparator-controller 1006. A second input s.p.4 of 1006 is coupled to a reference signal Vref4 which has a level proportional to the preselected desired time for pressurizing chamber 38 or 40.

Pressurization time measuring device 1004 measures the time it takes for the sensed pressure at the inlet of valve 20a to reach Vref2. An output signal is generated at the output of 1004 which has a level proportional to the time measured for the pressure in chamber 38 or 40 to reach the level of Vref2. Comparator-controller 1006 compares the output signal from 1004 with Vref4 and generates an output signal at the output thereof which is proportional to the difference between the two. This output signal is a cut signal which controls converter 110. Converter 110 adjust the size of the opening through valve 18a at the beginning of pressurization such that during the pressurization portion of the next cycle of operation the rate of flow of air into chamber 38 or 40 is adjusted so as to pressurize the chamber within the desired time period Vref4.

Comparator-controller 118 is adapted to be decoupled from converter 110 during the pressurization and equalization portions of the cycle of operation of system 1000. Comparator-controller 1006 is adapted to be decoupled from convertor 110 during the production portion of the cycle of operation of system 1000.

The mathematical function performed by comparator-controller 1004 is of the following form:

$$M=G(r-c)+K, \quad \text{(Eq. 4)}$$

where M is the output, G=the proportional gain, r=the first input signal level to 1004 (the process variable-time), c=the second input signal level to the s.p.4 input of 1004 (the Vref4 level), and K is the output level of 1004 when r−c=0 (i.e., there is no difference (error) between r and c).

In the preferred embodiment 1004 and 1006 are implemented by an Eagle Signal Model No. EPTAK 240 microprocessor using software provided therewith. The memory of the microprocessor contains instructions in coded form to provide the sequence of control signals described herein. Appendix A lists the control program in the language of the Eagle Signal microprocessor used.

Figure 4B:
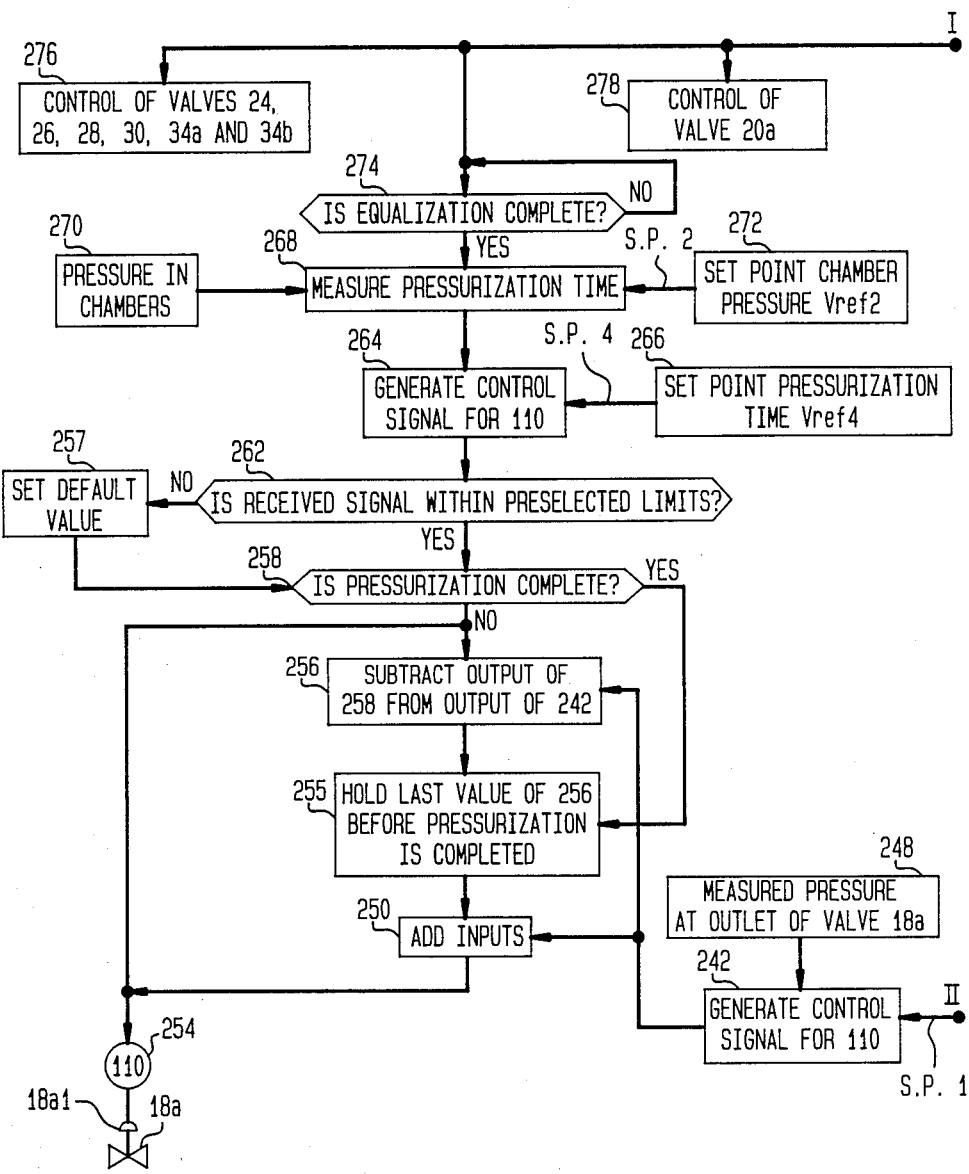

Referring now to the flow diagram of FIG. 4, there is shown a basic operation of system 1000 of FIG. 3. In block 200 a decision is made as to whether a start button associated with system 1000 has been engaged (pushed in) to start system 1000. If the start button has been engaged then all input and output signal levels of 46, 104, 106, 108, 110, 112, 114, 116, 118, 1004, and 1006 are scanned and recorded as indicated in block 202. As denoted in block 204, a determination is then made if the impurity level of oxygen in the nitrogen exiting tank 44 is less than a preselected system 1000 shut down value. If the impurity level is not below the shut down valve then the output (decision) of block 204 is NO. In block 206 a decision is made as to whether a bypass switch has been activated so as to ignore the greater than shut down level of the oxygen. If the system has not been in operation for a period of time then there may be substantial amount of oxygen in tank 44. An operator knowing this will generally elect to push in the by pass button (i.e. a YES decision) and allow the system to run until a steady state condition is achieved. If the by pass button is not activated (i.e. a NO decision) then system 1000 stops operating as is indicated by block 208.

If the answer to the determination in block 204 is YES then block 210 determines if an automatic preselected time delay has been completed such that system 1000 has reached a steady state operation. If the answer is NO then block 214 sets system 1000 into the manual mode of operation. Block 215 then sets the value of a signal applied to input s.p.3 of 114 to the value of the signal existing at the output of 46 which was recorded in block 202. If the answer of the determination of block 210 is YES then block 212 determines whether or not an automatic/manual switch has been switched to automatic. If the answer is NO then block 214 sets system 1000 to the manual mode of operation. If the answer is YES then block 216 determines if the measured pressure in buffer tank 44 is below a high preselected pressure limit. If the answer is YES then block 220 sets system 1000 to an automatic mode of operation and then block 222 sets the signal level applied to s.p.3 to a preselected level (a desired value). If the answer is NO then block 218 determines if the impurity level of oxygen in the nitrogen exiting tank 44 is greater than a preselected limit (s.p.3). If the answer is NO then block 214 sets system 1000 to the manual mode of operation. If the answer is YES then block 220 sets system 1000 to the automatic mode of operation.

If system 1000 has been set to automatic then the value set by block 222 is entered into block 224 and the value of the signal at s.p.3 generated by block 224 is the same as the value set by block 222. If system 1000 has been set to manual then the value of the signal at s.p.3 set by block 215 is entered into block 224 and the value of the signal to s.p.3 generated by block 224 is the value set by block 215. Block 226 receives an input from block 228 which provides the value of the oxygen impurity level in tank 44 and receives the s.p.3 signal level from block 224. Block 226 generates an output signal level which is proportional to the difference between the two input signals thereto and effectively performs the mathematical function of Eq. 3. An output signal from block 226 is coupled to blocks 230 and 234. Block 230 determines if system 1000 is in manual control. If the answer is YES then block 232 subtracts the output level received from a level existing at input s.p.1 of a block 242 and couples the calculated value to blocks 233 and 234. If the system is in manual then value of the signals from blocks 232 and 233 is identical. If the system is in automatic then the last value of the output signal of block 232 is stored in block 233 and is sent by block 233 to block 234. If the decision of block 230 is NO, then the value which existed at block 232 just before the automatic mode was selected is coupled to block 234. Block 234 adds the input levels received from blocks 226 and 232 or 233 and couples the calculated output signal thereof to block 236. Block 236 determines if system 1000 is in the automatic mode of operation. If the answer is YES then a signal is sent to block 246. If the answer is NO then a signal is sent to block 238.

Blocks 230, 232, 233 and 234 cooperate to insure that there is a bumpless transfer when system 1000 is switched from a manual mode of operation to an automatic mode of operation. This means that the signal level existing at the output of block 234 at the beginning of an automatic mode of operation is the same as existed at the end of a manual code of operation. This in turn keeps the input level to input s.p.1 of block 242 at the same level during the start of automatic operation as it was during the end of manual operation.

Block 238, when activated by a signal from block 236, sends out a signal to block 240 which is the last output signal of block 234 before system 1000 left the automatic mode of operation. Block 244 decides if an operator has entered a value for s.p.1. If the answer is YES then the entered value is coupled to block 240. Block 240 couples a signal received at either of its two inputs to an s.p.1 input of block 242. If input signals appear on both of the inputs to block 240, block 240 selects the input from block 244 and transmits it to the s.p.1 input of block 242. If block 246 receives a signal whose level is above a preselected level (a YES decision) then it transmits the received level. If block 246 receives a signal whose level is below a preselected level then it does not transmit that level (a NO decision) and a default level is transmitted by block 245 to the s.p.1 input of block 242. This prevents gas flow through the chamber from being completely stopped. Block 246 transmits the received signal level from block 236 to block 242 if the received signal level from 236 is above the preselected level. Only one of output signals of blocks 240 and 246 is transmitted to block 242 at a given time. If system 1000 is in the automatic mode of operation than the signal to the s.p.1 input of block 242 comes from block 246. If system 1000 is in the manual mode of operation then the signal to the s.p.1 input of block 242 comes from block 240.

Block 242 receives an input signal representing the inlet pressure of chamber 38 or 40, which is measured and transmitted by pressure sensor transmitter 104, from block 248. An output from block 242 is coupled to inputs of blocks 250 and 256. Block 242 effectively performs the mathematical function of equation Eq. 1.

The output of block 204 is also coupled to block 274 which decides if the equalization portion of the cycle of operation of system 1000 is complete. If the answer is YES then a signal is sent to block 268 from block 274. Block 268 receives the measured value of the pressure in chamber 38 or 40 at one input from block 270 and receives a preselected applied reference signal pressure level Vref2 from block 272 at a second input thereof. Block 268, which performs the function of device 1004 of FIG. 3, measures the time it takes for the pressure in chamber 38 or 40 to go from that value existing at the end of the equalization portion of the cycle of operation until the end of the pressurization part of the cycle of operation when valve 20a opens.

Block 264 receives at one input thereof the time measurement output signal of block 268 and receives at a second input s.p.4 thereof a preselected desired time Vref4 for pressurization of chamber 38 or 40 from block 266. The basic mathematical function of comparator-controller 1006 of FIG. 3, as shown in equation Eq. 4, is performed by clock 264. Block 262 receives an output signal from block 264 and transmits that signal to block 258. If the signal received by block 262 is within preselected limits, a YES decision, then the output of block 262 is coupled directly to a first input of block 258. If the signal received by block 262 is not within preselected limits, a NO decision, then the output of block 262 is coupled to block 257 which in turn sends a default signal level to block 258. Block 258 determines if the pressurization portion of the cycle of operation is complete. If the answer is NO then an output signal of block 258 is transmitted to blocks 254 and 256 (convertor 110). If the answer is YES then the output of block 258 is coupled to block 255. Block 256 subtracts the output of block 258 from the output of block 242 and transmits the result to block 255. Block 255 stores the current value from the output of block 256 until the end of the pressurization portion of the cycle of operation. At the end of the pressurization portion of the cycle, block 258 allows the value of 255, which is the last value of block 256 before pressurization was completed, to be added to the value of 242 in block 250 and then the resultant is transmitted from block 250 to block 254. At this time block 258 inhibits the signal from 258 to 254.

Blocks 250, 255 and 256 cooperate such that there is a bumpless transfer of control of block 254 from the end of the pressurization portion of the cycle of operation to the beginning of the production portion of the cycle of operation.

The YES output of block 204 is also coupled to inputs of blocks 276 and 278. Block 276 represents a plurality of blocks which result in all the valves, except for valves 18a, 20a and 48, being opened and closed at the needed appropriate times during a cycle of operation of system 1000. Block 278 represents blocks which would illustrate the function of pressure sensor and transmitter 106, convertor 112, and comparator-controller 116 which was already explained as part of the above discussion of FIG. 2. Block 278 essentially performs the mathematical function of equation Eq. 2.

It is to be understood that the embodiments described herein are merely illustrative of the general principles of the invention. Various modifications are possible within the general principles of the invention: For example, the comparator-controllers could be formed from hardware components or could be software and an other computer than the one denoted. Further, valve 20 and the pressure sensor and comparator-controller associated therewith could be replaced by a mechanical regulator like 20 of FIG. 1. Still further, the sensing and current generating components could be modified to provide output voltage signals instead of output current signals. Still further, the control systems which control the air flow during pressurization and production could be used separately. Furthermore, a plurality of chambers, which are greater in number than two, could be used. Still further, the oxygen vented into the atmosphere could be collected as a product. Furthermore, systems 100 and 1000 can be modified so as to control the input air flow into the chambers by varying an opening in a valve which replaces valve 48 instead of varying the opening in valve 18a. In this case a regulator like 18 of FIG. 1 or the combination of a valve, convertor means, pressure sensing means and a comparator-controller with a fixed set input signal level could be substituted for valve 18a. Valve 20a and the control components associated therewith could be eliminated and valve 18a, pressure sensor 104, convertor means 110 and convertor-controller 118 could be substituted for valve 48 with 104 being coupled to the inlet side of 18a instead of to the outlet side (as is shown in FIGS. 2 and 3). Still further, systems 100 and 1000 can be modified such that the amount of impurity to be tolerated is within a preselected range rather than just a single level.

APPENDIX A

```
1  LD          IN    101
2  AND NOT     CR    11
3  AND NOT     CR    13         COMMAND TO BEGIN PROGRAM OPERATION
4  STO         CR    51
5  STO         OUT   126
----------------------------------------------------------------
6  LD  NOT     CR    50
7  JMP               1
8  LD  ACT     ALG   116
9  STO         DAT   21
10 LD          CR    50
11 LD          CR    50
12 AND NOT     CR    22
13             TMR   4
14 STO         CR    22
15 LD          CR    22
16 JMP               3          OXYGEN SIGNAL SMOOTHING ROUTINE
17 LD                2
18 DIV         DAT   21
19 STO         DAT   21
20 LD                2
21 DIV ACT     ALG   116
22 ADD         DAT   21
23 STO         DAT   21
24 STO         DAT   22
```

```
25 LD        DAT   22
26 GE   ACT  CTR   6
28 LD        CR    7
29 AND NOT   IN    102
30 AND       CR    51
31 LD  NOT   CR    8
32 AND       CR    7
33 AND       IN    101      HIGH OXYGEN SHUTDOWN
34           TMR   5
35 STO       CR    8
36 LD        CR    8
37 LD        IN    101
38 AND       CR    11
39 OR        LD
40 STO       OUT   124
41 STO       CR    11
42 JMP             0
43 JMP             0
44 JMP             0
45 JMP             0
```
---
```
46 LD        CR    51
47 LD        CR    51
48           TMR   7
49 STO       CR    52
50 LD        CR    51      VENT VALVES OPEN UPON STARTUP
51 AND NOT   CR    52
52 STO       CR    53
53 LD        CR    52
54 STO       CR    50
```
---
```
55 LD        CR    50
```

| | | | |
|---|---|---|---|
| 56 AND | | OUT | 121 |
| 57 LD | | CR | 42 |
| 58 LD | | CR | 50 |
| 59 | | CTR | 3 |
| 60 STO | | CR | 41 |

QUICK CYCLE ACTIVATION

---

| | | | |
|---|---|---|---|
| 61 LD | NOT | CR | 41 |
| 62 JMP | | | 1 |
| 63 LD | SET | CTR | 7 |
| 64 STO | SET | TMR | 1 |

SET QUICK CYCLE TIME

---

| | | | |
|---|---|---|---|
| 65 LD | | CR | 41 |
| 66 JMP | | | 1 |
| 67 LD | SET | CTR | 10 |
| 68 STO | SET | TMR | 1 |

SET NORMAL CYCLE TIME

---

| | | | |
|---|---|---|---|
| 69 LD | NOT | CR | 51 |
| 70 LD | NOT | CR | 51 |
| 71 | | TMR | 9 |
| 72 STO | | CR | 40 |
| 73 LD | | CR | 40 |
| 74 LD | | CR | 40 |
| 75 | | TMR | 14 |
| 76 STO | | CR | 37 |
| 77 LD | | CR | 40 |
| 78 AND NOT | | CR | 37 |
| 79 STO | | CR | 39 |

VENT VALVES OPEN UPON SHUTDOWN

---

| | | | |
|---|---|---|---|
| 80 LD | | CR | 50 |
| 81 LD | | CR | 50 |
| 82 AND NOT | | CR | 3 |
| 83 | | TMR | 1 |
| 84 STO | | CR | 3 |

TOTAL CYCLE TIMER

```
85 LD       CR    50
86 LD       CR    50
87 AND NOT  CR    3       EQUALIZATION TIMER
88          TMR   2
89 STO      CR    4
------------------------------------------------------------
90 LD       CR    4
91 AND NOT  CR    5
92 STO      CR    6       PULSE AT EQUALIZATION
93 LD       CR    4
94 STO      CR    5
------------------------------------------------------------
95 LD       CR    3
96 OR       CR    6       FORWARD JOG TO SHIFT REGISTER No. 1
97 STO      CR    2
------------------------------------------------------------
98 LD       CR    1
99 LD       CR    2                                    CONTROL
100 LD      CR    50      SHIFT REGISTER No. 1   SWITCHING VALVE
101         SR    1
------------------------------------------------------------
102 LD NOT  CR    50
103 OR      SR    101
104 OR      SR    105     SR 1 INITIALIZED TO STAGE 1
                          RESET TO STAGE 1 WHEN IN STAGE 5
105 STO     SR    101
------------------------------------------------------------
106 LD      SR    101
107 OR      SR    103     STAGE 1 & 3  EQUALIZATION
108 STO     OUT   121
------------------------------------------------------------
109 LD      SR    102
```

| | | | |
|---|---|---|---|
| 110 STO | OUT | 117 | STAGE 2  FEED CHAMBER A |
| 111 STO | OUT | 127 | |

---

| | | | |
|---|---|---|---|
| 112 LD | SR | 102 | |
| 113 OR | CR | 39 | STAGE 2  VENT CHAMBER B |
| 114 OR | CR | 53 | |
| 115 STO | OUT | 120 | |

---

| | | | |
|---|---|---|---|
| 116 LD | SR | 104 | STAGE 4  FEED CHAMBER B |
| 117 STO | OUT | 118 | |

---

| | | | |
|---|---|---|---|
| 118 LD | SR | 104 | |
| 119 OR | CR | 39 | STAGE 4  VENT CHAMBER A |
| 120 OR | CR | 53 | |
| 121 STO | OUT | 119 | |

---

| | | | |
|---|---|---|---|
| 122 LD | CR | 50 | |
| 123 LD | CR | 50 | AUTO CONTROL DELAY UPON STARTUP |
| 124 | TMR | 8 | |
| 125 STO | CR | 38 | |

---

| | | | |
|---|---|---|---|
| 126 LD | IN | 104 | AUTO SHUTDOWN INITIATED |
| 127 STO | CR | 13 | |

---

| | | | |
|---|---|---|---|
| 128 LD NOT | IN | 103 | |
| 129 LD | CR | 4 | |
| 130 AND | CR | 16 | |
| 131 OR | LD | | |
| 132 STO | CR | 16 | |
| 133 LD | CR | 3 | |
| 134 AND NOT | CR | 16 | BUFFER PRESSURE LOW |
| 135 STO | CR | 19 | |

```
136 LD        CR    16
137 AND       CR     3
138 LD        CR    21
139 LD  NOT   CR    19
140           CTR    4
141 STO       CR    23
```

---

```
142 LD        DAT   22
143 GE  SET   CTR    6
144 STO       CR    26
145 LD        CR    23        AUTO CONTROL SET ON
146 AND       IN   105
147 LD        CR    26
148 OR        LD
149 AND       CR    38
150 STO       CR    24
```

---

```
151 LD        CR    24
152 JMP             1
153 LD  SET   CTR    8        PURITY SETPOINT WHEN IN AUTOMATIC CONTROL
154 MLT SET   CTR    6
155 STO SET   ALG  116
```

---

```
156 LD  NOT   CR    24
157 JMP             1
                              PURITY SETPOINT WHEN IN MANUAL CONTROL
158 LD  ACT   ALG  116
159 STO SET   ALG  116
```

---

```
160 LD        DAT   22
161           PID  116        PURITY CONTROL ALGORITHM
162 STO       DAT    7
```

---

```
163 LD   ACT CTR   9
164 DIV      DAT   7        PURITY CONTROL GAIN ADJUSTMENT
165 STO      DAT   15
---------------------------------------------------------------
166 LD       CR    24
167 JMP            1
168 LD       DAT   11
169 STO  SET CTR   2
170 LD   NOT CR    24       AUTO/MANUAL TRACKING ROUTINE
                            ON FEED AIR SETPOINT
171 JMP            1
172 LD   SET CTR   2
173 STO      DAT   11
---------------------------------------------------------------
174 LD   NOT CR    24
175 JMP            3
176 LD       DAT   11
177 SUB      DAT   15
178 STO      DAT   13
179 STO      CR    17
180 LD       CR    17
181 LD            9999
182 SUB      DAT   13
183 STO      DAT   13
                            AUTO/MANUAL BUMPLESS TRANSFER ROUTINE
184 LD       CR    24       ON FEED AIR SETPOINT
185 AND NOT  CR    17
186 JMP            1
187 LD       DAT   15
188 ADD      DAT   13
189 STO      DAT   11
190 LD       CR    24
191 AND      CR    17
192 LD       DAT   15
```

```
193 SUB      DAT    13
194 STO      DAT    11
195 LD       CR     43
196 JMP             1
197 LD       DAT    11
198 STO      DAT    29
------------------------------------------------
199 LD              20
200 ADD SET  ALG    115
201 STO      DAT    6
202 LD       DAT    6
203 BE  SET  CTR    2
204 STO NOT  CR     43
205 LD  NOT  CR     43        LOW LIMIT ON AIR FEED SETPOINT WHEN IN
                              AUTOMATIC CONTROL
206 JMP             1
207 LD       DAT    6
208 STO      DAT    29
209 LD       DAT    29
210 STO SET  ALG    114
------------------------------------------------
211 LD              100
212 DIV SET  ALG    115
213 MLT ACT  CTR    2         START OF PRODUCTION
214 GRT ACT  ALG    115
215 STO NOT  CR     25
------------------------------------------------
216 LD       SR     102
217 LD       SR     104
218 OR       LD
219 AND NOT  CR     25        PRESSURIZATION TIMER
220 LD  NOT  CR     6
221          TMR    3
222 STO      CR     12
```

```
223 LD      CR      25
224 JMP             1
225 LD              9999         MEASURE PRESSURIZATION TIME
226 SUB ACT TMR     3
227 STO     DAT     26
```

```
228 LD      IN      108
229 AND     CR      6
230 JMP             11
231 LD      DAT     26
232 SUB SET ALG     111
233 STO     DAT     27
234 STO     CR      18          CALCULATE PRESSURIZATION TIME ERROR
235 LD      CR      18
236 JMP             1
237 LD              9999
238 SUB     DAT     27
239 STO     DAT     27
```

```
240 LD      DAT     27
241 MLT SET ALG     113         PRESSURIZATION TIME CONTROL INCREMENT
242 STO     DAT     28
```

```
243 LD  SET ALG     112
244 GE      DAT     27          PRESSURIZATION TIME CONVERGENCE
245 STO     CR      63
```

```
246 LD  NOT CR      63
247 AND     CR      18
248 JMP             1
                                DECREASE FEED VALVE POSITION IF HIGHER
249 LD  SET CTR     9           PRESSURIZATION TIME IS REQUIRED
```

```
250 SUB        DAT    28
251 STO SET    CTR     9
252 STO        CR     55
```
---
```
253 LD  NOT    CR     63
254 AND NOT    CR     18
255 JMP               1      INCREASE FEED VALVE POSITION IF LOWER
256 LD  SET    CTR     9     PRESSURIZATION TIME IS REQUIRED
257 ADD        DAT    28
258 STO SET    CTR     9
259 STO        CR     60
```
---
```
260 LD         CR     55
261 JMP               1      LOW LIMIT ON FEED VALVE POSITION
262 LD              2000
263 STO SET    CTR     9
```
---
```
264 LD         CR     60
265 JMP               1      HIGH LIMIT ON FEED VALVE POSITION
266 LD              9999
267 STO SET    CTR     9
```
---
```
268 LD  NOT    CR     25
269 JMP               1      FEED VALVE POSITION DURING PRESSURIZATION
270 LD  SET    CTR     9
271 STO        DAT     9
```
---
```
272 LD  ACT    ALG   114
273            PID   114     PID CONTROL ON FEED AIR PRESSURE
274 STO        DAT    25
```
---
```
275 LD  NOT    CR     25
```

| | | | |
|---|---|---|---|
| 276 JMP | | 3 | |
| 277 LD | DAT | 25 | |
| 278 SUB SET | CTR | 9 | PRESSURIZATION NOT COMPLETE |
| 279 STO | DAT | 23 | |
| 280 STO | CR | 27 | |
| 281 LD | CR | 27 | |
| 282 LD | | 9999 | |
| 283 SUB | DAT | 23 | |
| 284 STO | DAT | 23 | |

---

| | | | |
|---|---|---|---|
| 285 LD | CR | 25 | |
| 286 AND NOT | CR | 27 | |
| 287 JMP | | 1 | |
| 288 LD | DAT | 25 | |
| 289 SUB | DAT | 23 | |
| 290 STO | DAT | 24 | PRESSURIZATION COMPLETE |
| 291 LD | CR | 25 | |
| 292 AND | CR | 27 | |
| 293 JMP | | 1 | |
| 294 LD | DAT | 25 | |
| 295 ADD | DAT | 23 | |
| 296 STO | DAT | 24 | |

---

| | | | |
|---|---|---|---|
| 297 LD | CR | 25 | |
| 298 JMP | | 1 | FEED VALVE POSITION DURING PRODUCTION |
| 299 LD | DAT | 24 | |
| 300 STO | DAT | 9 | |

---

| | | | |
|---|---|---|---|
| 301 LD | DAT | 9 | OUTPUT TO FEED AIR CONTROL VALVE |
| 302 STO | ALG | 131 | |

---

| | | | |
|---|---|---|---|
| 303 LD SET | ALG | 115 | |

```
304         PID    115
305 STO    DAT      1
                              BED PRESSURE CONTROL
306 LD            9999
307 SUB    DAT      1
308 STO    ALG    132
```
-------------------------------------------

| ANALOG INPUT | FUNCTION | RANGE | SIGNAL IN | SCALE |
|---|---|---|---|---|
| ALG 114 | AIR FEED PRESSURE | 0 - 200 PSIG | 4 - 20 MA | 0 - 9999 |
| ALG 115 | BED PRESSURE | 0 - 200 PSIG | 4 - 20 MA | 0 - 9999 |
| ALG 116 | PRODUCT PURITY | 0 - 5 % O2 | 4 - 20 MA | 0 - 9999 |

| ANALOG OUTPUT | FUNCTION | SIGNAL OUT |
|---|---|---|
| ALG 131 | FEED AIR CONTROL VALVE | 4 - 20 MA |
| ALG 132 | BED PRESSURE CONTROL VALVE | 4 - 20 MA |

| DIGITAL INPUT | FUNCTION |
|---|---|
| IN 101 | START SYSTEM |
| IN 102 | OXYGEN ANALYZER BYPASS SWITCH |
| IN 103 | PRESSURE SWITCH 1 (PURITY CONTROL) |
| IN 104 | PRESSURE SWITCH 2 (AUTO STOP/START) |
| IN 105 | AUTO/MANUAL SELECTOR SWITCH |

| DIGITAL OUTPUT | FUNCTION | VOLTAGE |
|---|---|---|
| OUT 117 | BED A FEED VALVE | 110 V AC |
| OUT 118 | BED B FEED VALVE | 110 V AC |
| OUT 119 | BED A VENT VALVE | 110 V AC |
| OUT 120 | BED B VENT VALVE | 110 V AC |
| OUT 121 | EQUALIZATION VALVES | 110 V AC |
| OUT 122 | DRAIN SOLENOID | 110 V AC |
| OUT 123 | DRAIN SOLENOID | 110 V AC |
| OUT 124 | O2 SHUTDOWN LIGHT | 110 V AC |

| | | |
|---|---|---|
| OUT 125 | ELAPSED TIME INDICATOR | 110 V AC |
| OUT 126 | O2 ANALYZER SOLENOID | 110 V AC |
| OUT 127 | | |

CONTROL RELAY

| | |
|---|---|
| CR 1 | SR 1 REVERSE JOG |
| CR 2 | SR 1 FORWARD JOG |
| CR 3 | END OF CYCLE |
| CR 4 | TRIGGER PULSE TO SR 1 |
| CR 5 | PULSE DEFEAT |
| CR 6 | PULSE TO SR 1 |
| CR 7 | O2 GREATER THAN SHUTDOWN VALUE |
| CR 8 | CR 7 ENERGIZED FOR MORE THAN 30 SEC |
| CR 9 | CTR 15 DUMMY |
| CR 10 | O2 GREATER THAN SHUTDOWN VALUE |
| CR 11 | HIGH O2 SHUTDOWN |
| CR 12 | TMR 12 ON |
| CR 13 | AUTO STOP/START INITIATE |
| CR 14 | AUTO STOP/START INITIATE |
| CR 15 | NOT USED |
| CR 16 | LATCH ON HIGH BUFFER PRESSURE |
| CR 17 | BUMPLESS TRANSFER |
| CR 18 | PRESSURIZATION TIME ERROR |
| CR 19 | HIGH BUFFER PRESSURE RESET |
| CR 20 | NOT USED |
| CR 21 | CTR 13 DUMMY |
| CR 22 | PURITY AVERAGING ROUTINE |
| CR 23 | BUFFER PRESSURE HIGH |
| CR 24 | AUTOMATIC CONTROL ON |
| CR 25 | START OF PRODUCTION |
| CR 26 | ACTUAL O2 CONTENT GREATER THAN SETPOINT |
| CR 27 | FEED AIR CONTROL |
| CR 28 TO CR 36 | NOT USED |
| CR 37 | CLOSE VENT VALVES |

| | |
|---|---|
| CR 38 | CONTROL DELAY SATISFIED |
| CR 39 | OPEN VENT VALVES |
| CR 40 | END OF EQUALIZATION AT SHUTDOWN |
| CR 41 | ACTIVATE QUICK CYCLE |
| CR 42 | CTR 3 "DUMMY" DOWN COUNT |
| CR 43 | FEED AIR PRESSURE SETPOINT LOW LIMIT ENABLED |
| CR 44 TO CR 49 | NOT USED |
| CR 50 | PROGRAM SEQUENCE BEGIN |
| CR 51 | BEGIN START UP SEQUENCE |
| CR 52 | CLOSE VENT VALVES |
| CR 53 | OPEN VENT VALVES |
| CR 54 | NOT USED |
| CR 55 | LOW LIMIT ON FEED VALVE |
| CR 56 | NOT USED |
| CR 57 | AUTOMATIC CONTROL ENABLED |
| CR 58 | NOT USED |
| CR 59 | PULSE AT START OF PRODUCTION |
| CR 60 | HIGH LIMIT ON FEED VALVE POSITION |
| CR 61 | PULSE AT START OF PRODUCTION |
| CR 62 | NOT USED |
| CR 63 | PRESSURIZATION TIME CONVERGENCE |
| CR 64 | NOT USED |
| TMR SET 1 1800 | TOTAL CYCLE TIME |
| TMR SET 2 40 | EQUALIZATION TIME |
| TMR SET 3 9999 | PRESSURIZATION TIMER |
| TMR SET 4 600 | PURITY AVERAGING INTERVAL |
| TMR SET 5 300 | HIGH OXYGEN TIMER |
| TMR SET 6 | NOT USED |
| TMR SET 7 600 | VENT VALVES OPEN AT STARTUP |
| TMR SET 8 1 | AUTO CONTROL DELAY |
| TMR SET 9 40 | PLANT EQUALIZATION AT SHUTDOWN |
| TMR SET 10 | NOT USED |
| TMR SET 11 | NOT USED |

| | | | | |
|---|---|---|---|---|
| TMR SET | 12 | | | NOT USED |
| TMR SET | 13 | | | NOT USED |
| TMR SET | 14 | 600 | | VENT VALVES OPEN AT SHUTDOWN |
| CTR SET | 1 | 2 | * | HIGH OXYGEN SHUTDOWN |
| CTR ACT | 1 | 2 | * | PURITY SETPOINT RAMP INCREMENT |
| CTR SET | 2 | | | FEED AIR SETPOINT |
| CTR ACT | 2 | 98 | | % OF MAX BED PRESSURE FOR PRESSURIZATION TIME |
| CTR SET | 3 | | * | QUICK CLEANUP CYCLES |
| CTR ACT | 3 | | * | |
| CTR SET | 4 | 5 | * | BUFFER PRESSURE/PURITY CONTROL |
| CTR ACT | 4 | | * | |
| CTR SET | 5 | | | NOT USED |
| CTR ACT | 5 | | | NOT USED |
| CTR SET | 6 | 1000 | | CONTROL PURITY SETTING |
| CTR ACT | 6 | 1300 | | SHUTDOWN PURITY SETTING |
| CTR SET | 7 | 200 | | QUICK CYCLE TIME |
| CTR ACT | 7 | | | NOT USED |
| CTR SET | 8 | 40 | | PURITY SCALE FACTOR |
| CTR ACT | 8 | | | NOT USED |
| CTR SET | 9 | 1709 | | FEED VALVE INITIAL POSITION (PROGRAM GEN.) |
| CTR ACT | 9 | 10 | | PID 116 GAIN ADJUSTMENT |
| CTR SET | 10 | 1800 | | NORMAL CYCLE TIME |
| CTR ACT | 10 | | | NOT USED |

* DENOTES FUNCTIONAL COUNTER - ALL OTHERS FOR DATA ENTRY ONLY

| | | |
|---|---|---|
| DAT | 1 | PID 115 OUTPUT |
| DAT | 2 | NOT USED |
| DAT | 3 | NOT USED |
| DAT | 4 | NOT USED |
| DAT | 5 | NOT USED |
| DAT | 6 | FEED AIR PRESSURE SETPOINT LOW LIMIT |
| DAT | 7 | PID 116 OUTPUT |
| DAT | 8 | NOT USED |

| | | |
|---|---|---|
| DAT | 9 | OUTPUT TO FEED AIR CONTROL VALVE |
| DAT | 10 | NOT USED |
| DAT | 11 | PROGRAM GENERATED FEED AIR PRESSURE SETPOINT |
| DAT | 12 | NOT USED |
| DAT | 13 | PURITY CONTROL BUMPLESS TRANSFER |
| DAT | 14 | NOT USED |
| DAT | 15 | PID 106 GAIN ADJUSTED OUTPUT |
| DAT | 16 | NOT USED |
| DAT | 17 | NOT USED |
| DAT | 18 | NOT USED |
| DAT | 19 | NOT USED |
| DAT | 20 | NOT USED |
| DAT | 21 | ACTUAL PURITY - FOR AVERAGING ROUTINE |
| DAT | 23 | PRESSURIZATION TIME CONTROL |
| DAT | 24 | PRESSURIZATION TIME CONTROL |
| DAT | 25 | PID 114 OUTPUT |
| DAT | 26 | ACTUAL PRESSURIZATION TIME |
| DAT | 27 | ACTUAL PRESSURIZATION TIME MINUS SETPOINT |
| DAT | 28 | PRESSURIZATION TIME CONTROL OUTPUT |
| DAT | 29 | FEED AIR PRESSURE SETPOINT |
| ALG SET 111 | 260 | PRESSURIZATION TIME |
| ALG SET 112 | 10 | PRESSURIZATION TIME CONVERGENCE LIMIT |
| ALG SET 113 | 10 | PRESSURIZATION TIME CONTROL GAIN |

PID 114        FEED AIR PRESSURE CONTROL

| | | |
|---|---|---|
| GAN | 101 | 50 |
| RAT | 101 | 0 |
| RST | 101 | 200 |
| CYT | 101 | 0 |

PID 115        BED PRESSURE CONTROL

| | | |
|---|---|---|
| GAN | 103 | 350 |

```
RAT      103    0

RST      103    150

CYT      103    0

PID  116                    PURITY CONTROL

GAN      106    1

RAT      106    300

RST      106    1

CYT      106    0
```

What is claimed is:

1. A control system adapted for use with a gas fractionalization system having a valve having an actuator which controls the size of an opening in the valve which is in communication with at least one chamber which is adapted to preferentially adsorb one or more components of gas entering therein, the control system comprising:

convertor means, which has an input and an output with the output being coupled to the actuator of the valve, for controlling the size of the opening in the valve;

flow detector means coupled to the chamber for generating at an output thereof a signal that is proportional to the rate of gas flowing through the chamber;

an impurity detector coupled to an outlet of the chamber, said impurity detector being adapted to generate at an output thereof a signal that is proportional to the amount of an impurity component of gas in a product component of the gas exiting the chamber;

a first comparator means, which has a first input which is adapted to be coupled to a first reference signal which is indicative of the amount of impurity that is to be tolerated in the product component of gas received from the chamber and has a second input coupled to the output of the impurity detector, for generating at an output thereof a signal which is proportional to the difference between the reference signal and the output signal of the impurity detector; and a second comparator means, which has a first input coupled to the output of the flow detector means, has a second input coupled to the output of the first comparator means and has an output coupled to the input of the convertor means, for comparing signals received from the first comparator means and the flow detector means and generating at the output thereof a signal which causes the convertor means to generate a signal which causes the actuator of the valve to adjust the size of the opening in the valve so as to maintain the purity of gas exiting the chamber at a preselected level.

2. The control system of claim 1 further comprising:
pressure sensing means, pressurization time measuring means, and a third comparator means;
the pressure sensing means being coupled to the chamber for sensing pressure within the chamber;
the pressurization time measuring means, which is coupled by a first input to the pressure sensing means and is adapted to be coupled by a second input thereof to a preselected pressure level, for generating an output signal proportional to the amount of time measured for the chamber to pressurize from a pressure reading determined by the pressure sensing means to a preselected level; and
the third comparator means, which is coupled by a first input thereof to an output of the pressurization time measuring means, is coupled by an output thereof to the control of the convertor means, and is adapted to be coupled by a second input thereof to a source of a reference signal which is proportional to a preselected time period in which it is desired that the chamber reach a preselected pressure level, for comparing the output signal of the pressurization time measuring means with the reference signal coupled to the second input thereof and generating at the output thereof a signal which causes the convertor means to generate a signal at the output thereof which causes the actuator of the valve to adjust the size of the opening in the valve so as to adjust the rate of flow of gas into the chamber such that the chamber is pressurized to a preselected level during a preselected time period.

3. The control system of claim 2 wherein the gas fractionalization system is a Pressure Swing Adsorption (PSA) system which uses air as incoming gas and which generates nitrogen with an impurity of oxygen as an output product.

4. The control system of claim 3 further comprising:
the PSA system uses a cycle of operation which includes pressurization and production portions; and
first decoupling means coupled between the second comparator means and the input of the convertor means for decoupling the output of the second comparator means from the input of the convertor means during a production portion of the cycle of operation.

5. The control system of claim 4 further comprising:
a PSA system including two adsorption chambers wherein the cycle of operation includes an equalization portion; and
second decoupling means coupled between the third comparator and the input of the convertor means for decoupling the output of the third comparator means from the input of the convertor means during the equalization and production portions of the cycle of operation.

6. A control system adapted for use with a gas fractionalization system having a valve having an actuator which controls the size of an opening in the valve which is in communication with at least one adsorption chamber which is adapted to preferentially adsorb one or more components of the gas entering therein, the control system comprising:

pressure sensing means being coupled to the chamber for sensing pressure within the chamber;

pressurization time measuring means being coupled by a first input to the pressure sensing means and being adapted to be coupled by a second input to a preselected pressure level for generating an output signal proportional to the amount of time measured for the chamber to pressurize from a pressure reading determined by the pressure sensing means to a preselected level;

convertor means, which has an input and an output with the output being coupled to the actuator of the valve, for controlling the size of the opening in the valve;

flow detecting means coupled to the chamber for generating at an output thereof a signal that is proportional to the rate of gas flowing through the chamber; and comparator means, which is coupled by a first input to an output of the pressurization time measuring means, is coupled by an output thereof to the input of the convertor means, and is adapted to be coupled by a second input thereof to a source of a reference signal which is proportional to a preselected time period in which it is desired that the chamber reach a preselected pressure level, for comparing the output signal of the pressurization time measuring means with the reference signal coupled to the second input thereof and generating at the output thereof a signal which causes the convertor means to generate a signal at the output thereof which causes the actuator of the valve to adjust the size of the opening in the valve so as to adjust the rate of flow of gas into the chamber such that the chamber is pressurized to a preselected level during a preselected time period.

7. The control system of claim 6 further comprising:
an impurity detector coupled to an outlet of the chamber, said impurity detector being adapted to generate at an output thereof a signal that is proportional to the amount of an impurity component of gas in a product component of the gas exiting the chamber;

an additional comparator means which has a first imput which is adapted to be coupled to a first reference signal which is indicative of the amount of impurity that is to be tolerated in the product component of gas received from the chamber and has a second input coupled to the output of the impurity detector, for generating at an output thereof a signal which is proportional to the difference between the reference signal and the output signal of the impurity detector; and a second additional comparator means, which has a first input coupled to the output of the flow detector means, has a second input coupled to the output of said additional comparator means and has an output coupled to the input of the convertor means, for comparing signals received from said additional comparator means and the flow detector means and generating at the output thereof a signal which causes the actuator of the valve to adjust the size of the opening in the valve so as to maintain the purity of a gas exiting the chamber at a preselected level.

8. The control system of claim 7 wherein the gas fractionalization system is a Pressure Swing Adsorption (PSA) system which uses air as the gas and which generates nitrogen with an impurity of oxygen as an output product.

9. The control system of claim 8 further comprising:
the PSA system uses a cycle of operation which includes pressurization and production portions; and
first decoupling means coupled between said second additional comparator means and the actuator of the converter means for decoupling the output of said second additional comparator means during the production portion of the cycle of operation.

10. The control system of claim 9 further comprising:
a PSA system including two adsorption chambers wherein the cycle of operation includes an equalization portion; and
second decoupling means between said comparator means and the input of the convertor means for decoupling the output of said comparator means from the input of the convertor means during the equalization and production portions of the cycle of operation.

11. A control system adapted for use with a Pressure Swing Adsorption (PSA) system having a first valve having an actuator which controls the size of an opening in the first valve through which air flows to a plurality of chambers which are each adapted to preferentially adsorb oxygen from the air entering therein, the control system comprising:

convertor means, which has an input and an output with the output being coupled to the actuator of the first valve, for controlling the size of the opening in the first valve;

first pressure detector means coupled to the chamber for generating at an output thereof a signal that is proportional to the rate of gas flowing through the chamber;

an impurity detector coupled to outlets of the chambers, said impurity detector being adapted to generate at an output thereof a signal that is proportional to the amount of oxygen in nitrogen exiting the chambers;

a first comparator means, which has a first input which is adapted to be coupled to a first reference signal which is indicative of the amount of oxygen that is to be tolerated in the nitrogen received from the chambers and has a second input coupled to the output of the impurity detector, for generating at an output thereof a signal which is proportional to the difference between the reference signal and the output signal of the impurity detector; and a second comparator means, which has a first input coupled to the output of the first pressure detector means, has a second input coupled to the output of the first comparator means and has an output coupled to the input of the convertor means, for comparing signals received from the first comparator means and the first pressure detector means and generating at the output thereof a signal which causes the convertor means to generate a signal which causes the actuator of the first valve to adjust the size of the opening in the first valve so as to maintain the amount of oxygen in nitrogen exiting the chambers at a preselected level.

12. The control system of claim 11 further comprising:
pressure sensing means, pressurization time measuring means, and a third comparator means;
the pressure sensing means being coupled to the chamber for sensing pressure within the chamber;
the pressurization time measuring means, which is coupled by a first input to the pressure sensing means and is adapted to be coupled by a second input port to a preselected pressure level, for generating at an output thereof a signal proportional to the amount of time measured for the chamber to pressurize from a pressure reading determined by the pressure sensing means to a preselected level; and
the third comparator means, which is coupled by a first input to an output of the pressurization time measuring means, is coupled by an output thereof to the input of the convertor means, and is adapted to be coupled by a second input thereof to a source of a reference signal which is proportional to a preselected time period in which it is desired that the chamber reach a preselected pressure level, for comparing the output signal of the pressurization time measuring means with the reference signal coupled to the second input thereof and generating at the output thereof a signal which causes the convertor means to generate a signal at the output thereof which causes the actuator of the first valve to adjust the size of the opening in the first valve so as to adjust the rate of flow of gas into the chamber such that the chamber is pressurized to a preselected level during a preselected time period.

13. The system of claim 12 further comprising pressure regulating means coupled to the outlets of the chambers for limiting pressure which can build up in the chambers.

14. The system of claim 13 wherein the pressure regulating means comprises:
a second valve having an actuator which controls the size of an opening in the second valve through which nitrogen containing an impurity of oxygen flows and having an inlet and an outlet;
second convertor means, which has an input and an output, the output of the second convertor means being coupled to the actuator of the second valve, for controlling the size of an opening through the second valve;
second pressure detecting means coupled to the outlets of the chambers for generating a signal which is proportional to the pressure within at least one of the chambers; and
a fourth comparator means, which has a first input which is adapted to be coupled to a fourth reference signal which is indicative of the upper limit of pressure which is desired to exist in one of the chambers and has a second input which is coupled to an output of the second pressure detecting means, for comparing signals applied to the inputs thereof and generating at an output thereof a signal which causes the actuator of the second valve to adjust the opening in the second valve so as to limit the pressure within a chamber to the level of the fourth reference signal.

15. The system of claim 14 further comprising a buffer tank having an inlet coupled to an outlet of the second valve and having an outlet coupled to the impurity detector.

16. The system of claim 15 further comprising third pressure detecting means coupled to the tank and to the first comparator means for measuring the pressure in the tank and causing a signal proportional to the measured pressure to be received by the first comparator means.

17. The control system of claim 16 wherein the PSA system cycle of operation includes pressurization and production portions, said system further comprising first decoupling means coupled between the second comparator means and the input of the convertor means for decoupling the output of the second comparator means from the input of the convertor means during the production portion of the cycle of operation.

18. The control system of claim 17 wherein the PSA system comprises two such chambers and wherein the cycle of operation includes an equalization portion between said chambers, said system further comprising second decoupling means coupled between the third comparator and the input of the convertor means for decoupling the output of the third comparator means from the input of the convertor means during the equalization and production portions of the cycle of operation.

19. The control system of claim 18 further comprising:
an orifice, third, fourth, fifth, sixth, seventh, eighth and ninth valves;
the orifice being coupled between an outlet of the first valve and inlets of the third and fourth valves;
an outlet of the third valve being coupled to an inlet of the first chamber;
an outlet of the fourth valve being coupled to an inlet of the second chamber;
inlets of the fifth and sixth valves being coupled to the inlet of the first and second chambers, respectively;
the fifth and sixth valves having outlets which are coupled together and each being characterized in that a flow of gas there through can only occur in one direction;
inlets of the seventh and eighth valves being couple to outlets of the first and second chambers, respectively;
outlets of the seventh and eighth valves being coupled together to an inlet of the second valve; and
the ninth valve being coupled between the two chambers.

20. The control system of claim 19 further comprising:
an air compressor having an inlet exposed to the atmosphere and having an outlet; and
an air receiver tank having an inlet coupled to an outlet of the air compressor and having an outlet coupled to an inlet of the first valve.

* * * * *